(12) United States Patent
Dyer

(10) Patent No.: US 7,937,117 B2
(45) Date of Patent: *May 3, 2011

(54) PORTABLE SPEAKERPHONE WITH PIVOTING MICROPHONE BOOM

(75) Inventor: Medford Alan Dyer, San Diego, CA (US)

(73) Assignee: GN Netcom A/S (DK)

( * ) Notice: Subject to any disclaimer, the term of this patent is extended or adjusted under 35 U.S.C. 154(b) by 194 days.

This patent is subject to a terminal disclaimer.

(21) Appl. No.: 10/715,001

(22) Filed: Nov. 17, 2003

(65) Prior Publication Data

US 2005/0105740 A1 May 19, 2005

(51) Int. Cl.
*H04M 1/00* (2006.01)
(52) U.S. Cl. .................. 455/569.1; 455/575.2
(58) Field of Classification Search ............... 455/569.1, 455/550.1, 575.1, 90.2
See application file for complete search history.

(56) References Cited

U.S. PATENT DOCUMENTS

| | | | |
|---|---|---|---|
| 4,237,339 A | 12/1980 | Bunting et al. | |
| 5,896,461 A | 4/1999 | Faraci et al. | |
| 5,901,223 A | 5/1999 | Wicks et al. | |
| 5,991,646 A * | 11/1999 | Frank et al. | 455/569.2 |
| 6,230,029 B1 * | 5/2001 | Hahn et al. | 455/575.2 |
| 6,636,749 B2 | 10/2003 | Holmes et al. | |
| 7,620,433 B2 * | 11/2009 | Bodley | 455/575.2 |
| 2004/0063456 A1 * | 4/2004 | Griffin et al. | 455/550.1 |
| 2004/0204168 A1 * | 10/2004 | Laurila | 455/569.1 |
| 2004/0229658 A1 * | 11/2004 | Kim et al. | 455/569.1 |

OTHER PUBLICATIONS

"Parrot DriveBlue-Plug N Drive Bluetooth Car Kit" http:www.mobilefun.co.uk/product/1822.htm, 2 pages, printed Nov. 3, 2003.
Pama Plug 'N' Go 4 Bluetooth, http://www.mobilefun.co.uk/product/2013.htm, 3 pages, printed Nov. 3, 2003.
"Sony Ericsson Bluetooth Car Kit HCB-30", http://www.mobilefun.co.uk/product/1349.htm, 3 pages, printed Nov. 3, 2003.
PCT International Search Report for PCT/US2004/38394, Applicant: Jabra Corporation, Forms PCT/ISA/210 and 220, dated Apr. 11, 2005 (5 pages).
PCT Written Opinion of the International Search Authority for PCT/US2004/38394, Applicant: Jabra Corporation, Form PCT/ISA/237, dated Apr. 11, 2005 (3 pages).
Non-Final Office Action dated Feb. 24, 2011 for U.S. Appl. No. 12/981,343.

* cited by examiner

*Primary Examiner* — Erika A Gary
(74) *Attorney, Agent, or Firm* — Vista IP Law Group, LLP.

(57) ABSTRACT

A wireless speakerphone with a pivoting microphone boom is provided. The speakerphone communicates via a wireless network to a cellular telephone, cellular telephone adaptor, land-line telephone, land-line telephone adaptor, computer, personal digital assistant, or other device capable of communicating via the wireless network. The microphone contained in the pivoting boom is a directional microphone, the design of the boom being such that the location of minimal microphone sensitivity is always directed towards the speakerphone's speaker. The wireless speakerphone may also include an integral display, thereby allowing various types of system information to be displayed, aid speakerphone/system configuration and provide expanded speakerphone functionality.

24 Claims, 7 Drawing Sheets

PORTABLE SPEAKERPHONE WITH PIVOTING MICROPHONE BOOM

BACKGROUND OF THE INVENTION

The need for hands-free communication devices began soon after telephones were first invented. For example, early telephone operators used headsets that included a speaker and a microphone that could be wired or patched into a switchboard, the headset allowing hands-free operation. In the decades that followed, other methods of allowing hands-free operation emerged, ranging from telephone handset cradles that allowed the user to comfortably cradle the handset between the user's head and shoulder, to speakerphones that allowed absolute hands-free operation as long as the user was within the allowable range of the phone's speaker and microphone. More recently, short range wireless telephones have provided people with the freedom to roam 'unconnected' within a limited range of a base unit, for example around the home or office. The advent of cellular telephones and networks have substantially increased this freedom, allowing people to roam untethered over both national and international regions.

While great progress has been made in the development of communication systems, only recently with the advent of Bluetooth and similar open specification technologies have developers been given the freedom to design short range, wireless devices that can connect to a variety of different networks and systems while offering worldwide compatibility. One type of device resulting from the development of these technologies is the wireless speakerphone that can connect to any similarly enabled device or system. When used with a cellular phone that is enabled/adapted for use with one of these technologies (e.g., Bluetooth), the user is able to enjoy the benefits of a speakerphone, unencumbered by wires or cables. Unfortunately these speakerphones tend to have limited functionality while providing inferior sound quality.

Accordingly, what is needed in the art is a wireless speakerphone with expanded functionality and improved audio quality. The present invention provides such a speakerphone.

SUMMARY OF THE INVENTION

The present invention provides a wireless speakerphone with a pivoting microphone boom or arm, the speakerphone capable of communicating via a wireless network to a cellular telephone, cellular telephone adaptor, land-line telephone, land-line telephone adaptor, computer, personal digital assistant, or other device capable of communicating via the wireless network. The microphone contained in the pivoting boom is a directional microphone (e.g., cardioid microphone). The design of the pivoting boom locates the null or location of minimal sensitivity in the direction of the speakerphone's speaker, thus minimizing coupling and echo effects. Preferably the wireless speakerphone of the invention includes an input transducer (e.g., a microphone), an output transducer (e.g., a speaker), a wireless networking subsystem, a controller/controller interface, a sound processor, a battery, means for electrically coupling the speakerphone to an external power source, an earphone jack, a headset jack and means for attaching the speakerphone in a variety of positions and to a variety of surface types. The wireless speakerphone may also include an integral display, fabricated using any of a variety of suitable technologies, thereby allowing various system information to be displayed, aid speakerphone/system configuration and provide expanded speakerphone functionality.

A further understanding of the nature and advantages of the present invention may be realized by reference to the remaining portions of the specification and the drawings.

DESCRIPTION OF THE SPECIFIC EMBODIMENTS

Figure 1:
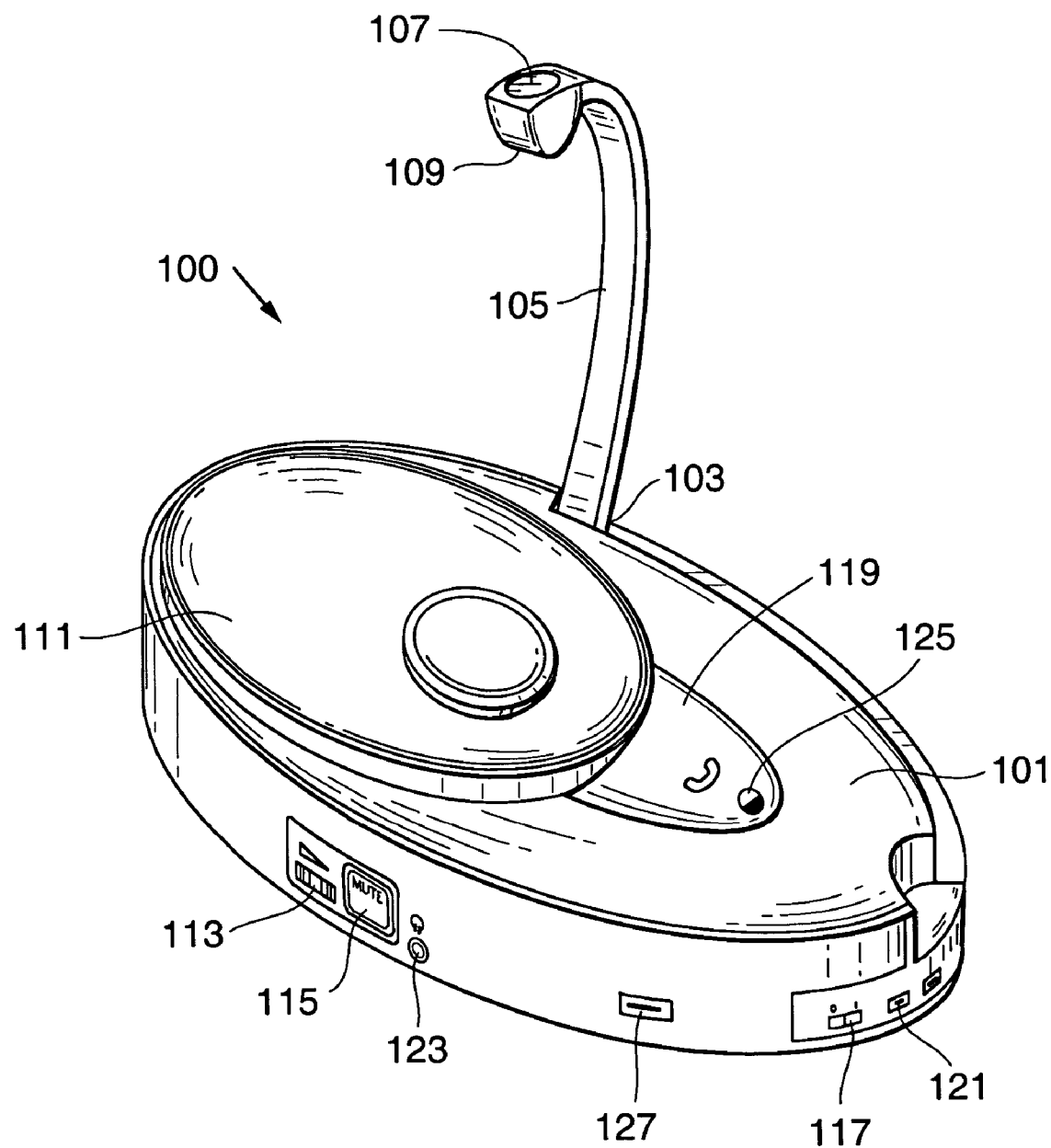
FIG. 1 is a perspective view of a preferred embodiment of a speakerphone in accordance with the invention with the microphone boom in an open position.
Figure 2:
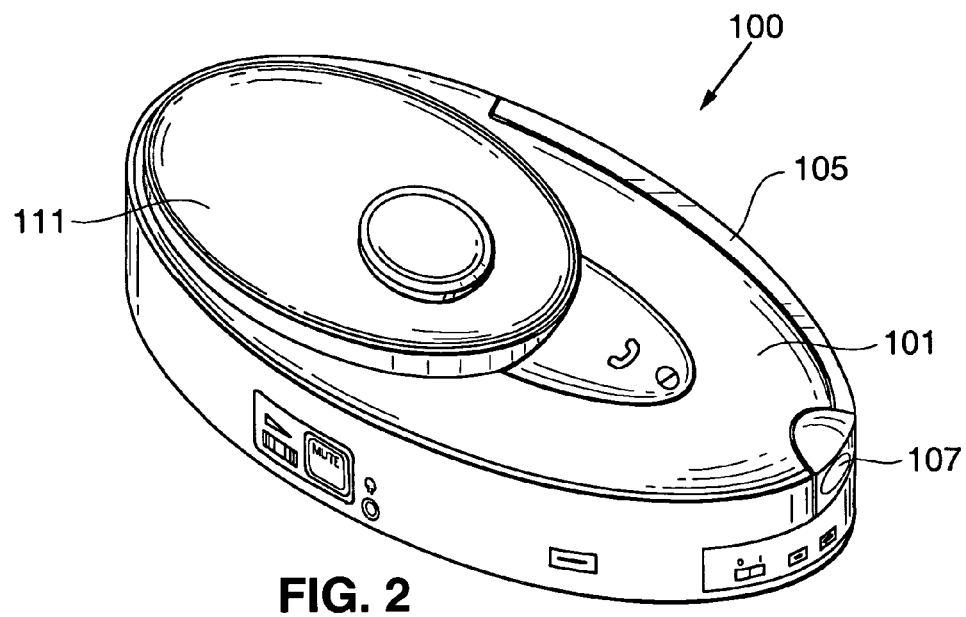
FIG. 2 is a perspective view of the embodiment shown in FIG. 1 with the microphone boom in a closed position.

FIGS. 1 and 2 are perspective views of a preferred embodiment of a speakerphone 100 in accordance with the invention. Coupled to body 101 of speakerphone 100 about pivot point 103 is a microphone boom or arm 105. FIG. 1 shows microphone boom 105 in an open position while FIG. 2 shows boom 105 in a closed or collapsed position. With the microphone boom in the closed position, the overall size of speakerphone 100 is minimized, thus providing a convenient size for carrying, for example between the user's office and car.

Mounted to or within microphone boom 105 is a directional microphone 107. Preferably microphone 107 is located at the distal end of boom 105 opposite pivot point 103 as shown. In the illustrated embodiment, microphone 107 is contained within microphone housing 109. To maximize audio pick-up sound quality, preferably microphone 107 is a unidirectional microphone exhibiting a cardioid polar pattern throughout its frequency range. Due to the design of speakerphone 100, the microphone's region of the lowest sensitivity is aimed at speaker 111 regardless of the position of the boom. As a result, the user is able to position boom 105 and microphone 107 for optimal pick-up while automatically minimizing pick-up from speaker 111. This benefit is illustrated further in FIG. 3. As shown in this side view, boom 105 and microphone 107 have been rotated part way between the fully open and closed positions in order to point microphone 107 along imaginary line 301 towards source 303 (i.e., the user). In this position the location of the microphone's null or axis of minimum sensitivity is directed at speaker 111 along imaginary line 305.

Figure 3:
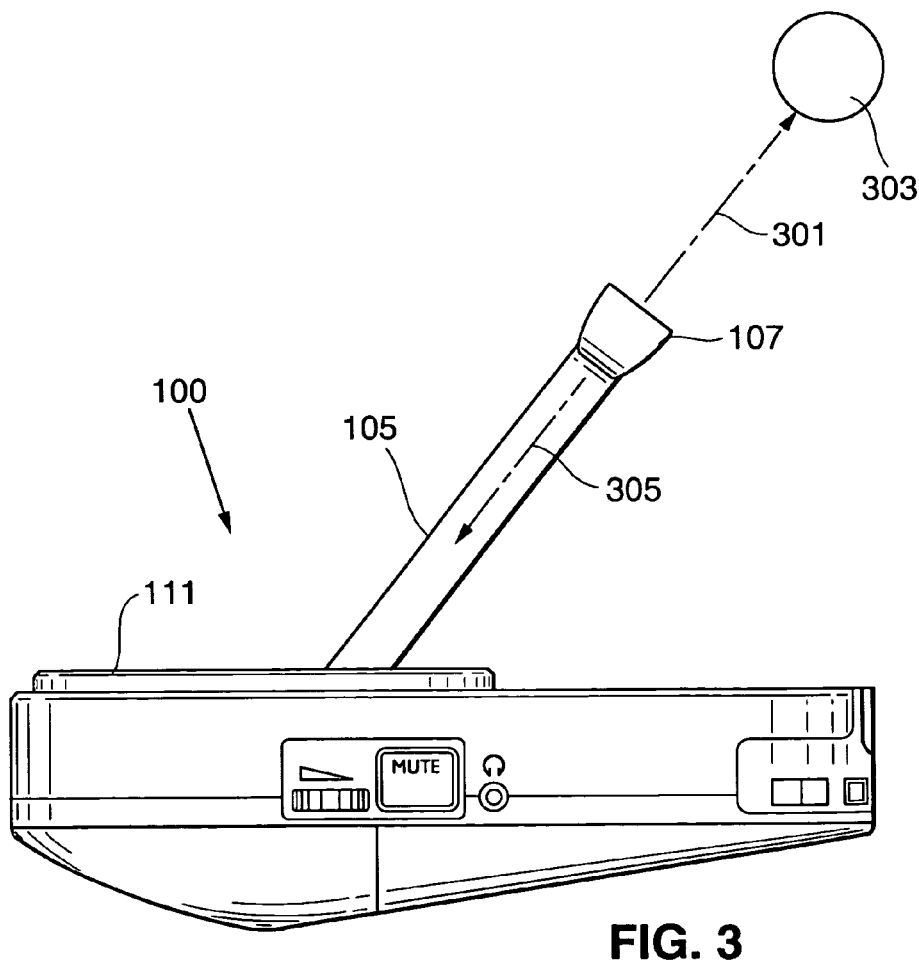
FIG. 3 is a side view of the embodiment shown in FIG. 1 with the microphone boom in a mid-position in order to optimize sound pick-up.

As shown in FIGS. 1-3, microphone boom 105 is of rigid construction. It will be appreciated that other embodiments may include a boom of non-rigid design, for example one that is flexible and/or telescopic in nature. Regardless of its design, boom 105 directs the null position of microphone 107 at speaker 111. Thus, for example, if boom 105 is telescopic, the boom is not allowed to rotate about its axis. As a result, the desired orientation of the microphone is retained regardless of the degree to which the boom is extended.

Speakerphone 100 includes one or more means of controlling the functionality of the speakerphone. In the preferred embodiment, these means include a volume control 113 to control the volume of speaker 111, a mute switch 115 to temporarily interrupt transmission of audio signals received by microphone 107 and a power switch 117 to conserve power when the speakerphone is not in use. A switch 119, preferably located for easy accessibility regardless of how the speakerphone is mounted, allows the user to easily answer an incoming call or hang-up the phone (i.e., on-hook/off-hook functionality). Speakerphone 100 typically includes at least one means 121 of connecting an external power source (e.g., car battery, AC line source, etc.) to the device. Preferably the external power source serves dual purposes, providing power to speakerphone 100 while simultaneously charging an internal battery source.

Speakerphone 100 may include an earphone jack 123 or other means of connecting an external earphone to the speakerphone. Although a separate earphone would normally not be used, under certain circumstances (e.g., noisy environment, confidential discussions) its use may be desirable.

Speakerphone 100 may include one or more visual indicators 125. Preferably indicator 125 is capable of providing two colors, for example, a first color (e.g., green) when speakerphone 100 is on and a second color (e.g., red) when the speakerphone is in use.

Speakerphone 100 may include an interface port 127, for example a serial port or a universal serial bus. Interface port 127, coupled to the internal processor, can be used to configure the speakerphone, for example modifying the processing systems (e.g., noise cancellation, voice recognition, etc.). Although the interface port may be internal, preferably it is an external port as shown, thus allowing the speakerphone to be easily updated or otherwise modified at any time.

Figure 4:
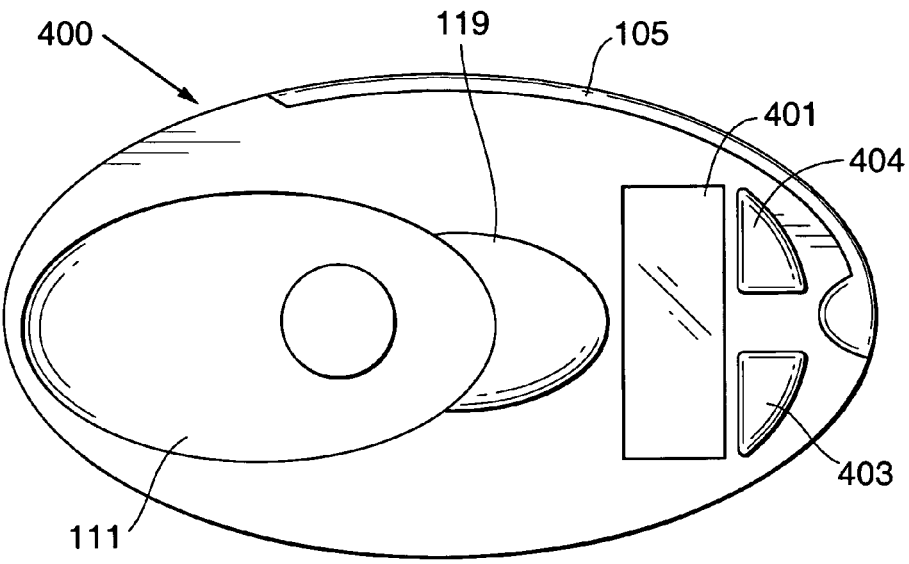
FIG. 4 is a top view of another embodiment of the invention in which the speakerphone includes a display.

FIG. 4 is a top view of another embodiment of a speakerphone 400 that includes a display 401. Display 401 can be used to provide the user with various types of information, the available information dependent upon display size and resolution, allowable power drain, and the processing capabilities and design of the on-board processor. The information can be provided with text, graphics, or both. Examples of information that can be displayed on display 401 are battery level, speakerphone volume level, call status (e.g., dialing, in use, etc.), caller identification, current time/date, and timer information such as elapsed time associated with a particular call. Display 401 can also be configured to flash or otherwise visually indicate an incoming call. Additionally, display 401 can be used during configuration of speakerphone 400 (e.g., providing menus, set-up instructions, etc.) or to provide additional functionality (e.g., phone lists, text messages, dialing using virtual numeric keypad or phone list dialing, calendar functions). Additionally, display 401 can be touch sensitive, thus providing a touch screen for data input (e.g., phone numbers into a phone list, dialing using a virtual numeric keypad). In order to more fully utilize the functionality provided by display 401, preferably speakerphone 400 includes additional input means (e.g., keys, buttons, switches, etc.). For example, in the illustrated embodiment, a pair of keys 403-404 is located adjacent to the display screen, thus providing the user with an easy means of navigating through the menus and/or other information (e.g., phone lists) shown on display 401. Keys 403-404 may also be used to provide the speakerphone with other functionality, for example replacing the rotational switch 113 as the means for controlling the device's volume level.

Display 401 preferably uses liquid crystal display (LCD) technology, although other types of technology can be used. For example, display 401 can use light emitting polymers (LEP), electroluminescent (EL) or active matrix electroluminescent (AMEL) technology, organic thin film transistors (organic TFT), active matrix organic light emitting diodes (AMOLED), amorphous silicon integrated displays (ASID), pliable display technology (PDT) or any other display technology that can provide a suitable resolution in the desired display size.

Figure 5:
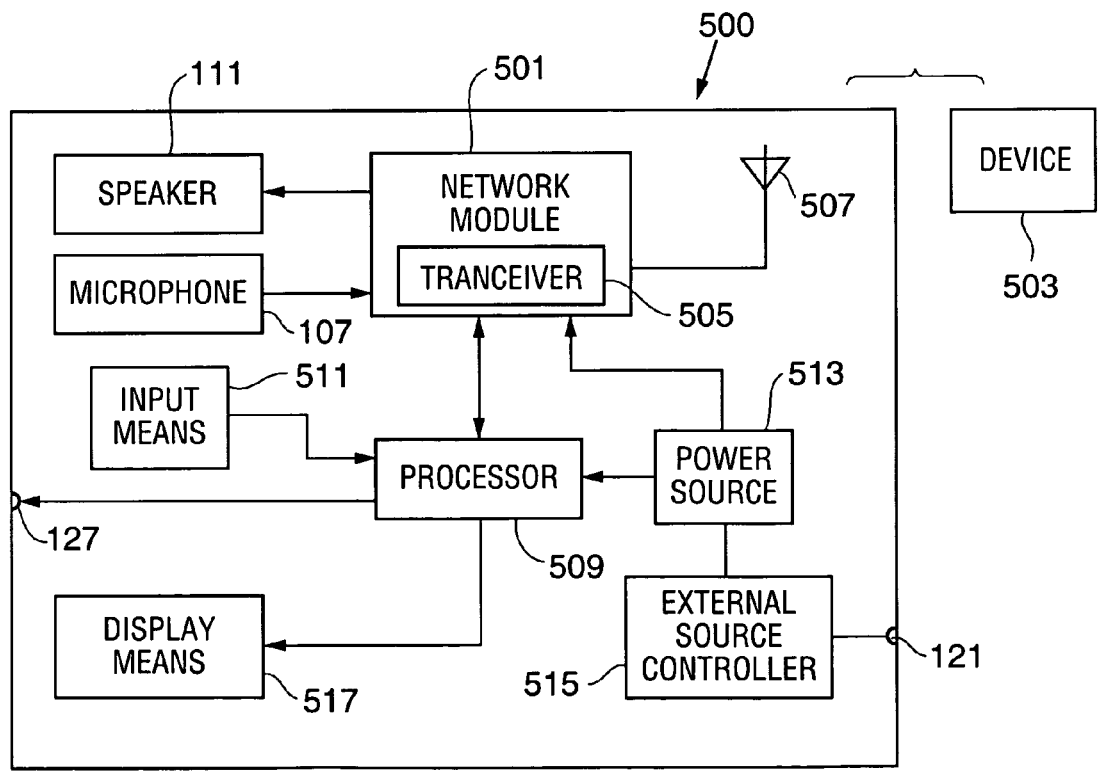
FIG. 5 is a high-level block diagram illustrating the primary internal systems of a speakerphone in accordance with the invention.

FIG. 5 is a high-level block diagram illustrating the primary internal systems of a speakerphone in accordance with the invention. As shown, system 500 includes a wireless networking module 501 that provides short distance (e.g., on the order of 30 feet) wireless communications between the speakerphone and a correspondingly enabled peripheral electronic device 503. Preferably peripheral electronic device 503 is a cellular telephone that communicates data (e.g., voice communications) via a cellular network to other devices. As cellular telephones and cellular telephone networks are well know in the art, further description will not be provided herein. Although device 503 is preferably a cellular telephone, the present invention can be used equally well with other types of properly enabled devices (e.g., cellular telephone adaptors, land-line telephones, land-line telephone adaptors, computers, personal digital assistants or PDAs, etc.).

Short distance wireless networking module 501 includes a transceiver 505 and can utilize any of a variety of networking technologies and protocols, as long as the selected system provides suitable networking capabilities between system 500 of the speakerphone and device 503. Examples of suitable technologies and standards include Bluetooth and IEEE802.11. As such technologies and standards are well know in the art (see, for example, the specifications found at www.bluetooth.com, www.standards.ieee.org/getieee802/802.11.html and www.grouper.ieee.org/groups/802/11/, all of which are incorporated herein by reference), further description will not be provided herein. Module 501, which is coupled to an appropriate antenna 507, controls the communication of signals between speaker 111 and microphone 107 of the speakerphone and device 503.

System 500 includes at least one processor 509 (e.g., controller, micro-controller, application specific integrated circuit or ASIC, etc.). Processor 509 can either be separate from module 501 as shown or combined with module 501. Additionally it will be appreciated that module 501 may include at least one additional processor, separate from processor 509. Processor 509 controls the functionality of the speakerphone, including sound processing capabilities (e.g., noise cancellation), system configuration, and the interface to the speakerphone. Typically one or more input means 511 are coupled to processor 509 (e.g., input means 113, 115, 117 and 119 of speakerphone 100; input means 403 and 404 of speakerphone 400; etc.).

Processor 509 is coupled to internal power source 513. Preferably power source 513 is a rechargeable battery, for example a nickel metal hydride or a lithium-ion rechargeable battery. In at least one embodiment, the rechargeable battery can be replaced with a standard battery source (e.g., alkaline batteries), thus allowing the user to continue to use the speakerphone even if the rechargeable battery has lost its power and the user does not have access to any means of recharging the battery. Assuming a rechargeable battery source, interposed between source 513 and external power source port 121 is a charge control circuit 515. Even if power source 513 is not rechargeable, circuit 515 may still provide an interface to an external power source coupled via port 121.

Processor 509 also controls the functionality of any display means 517 coupled to the speakerphone. Display means 517 can be single status indicators (e.g., indicator 125) or a display screen (e.g., display 401).

Figure 6:
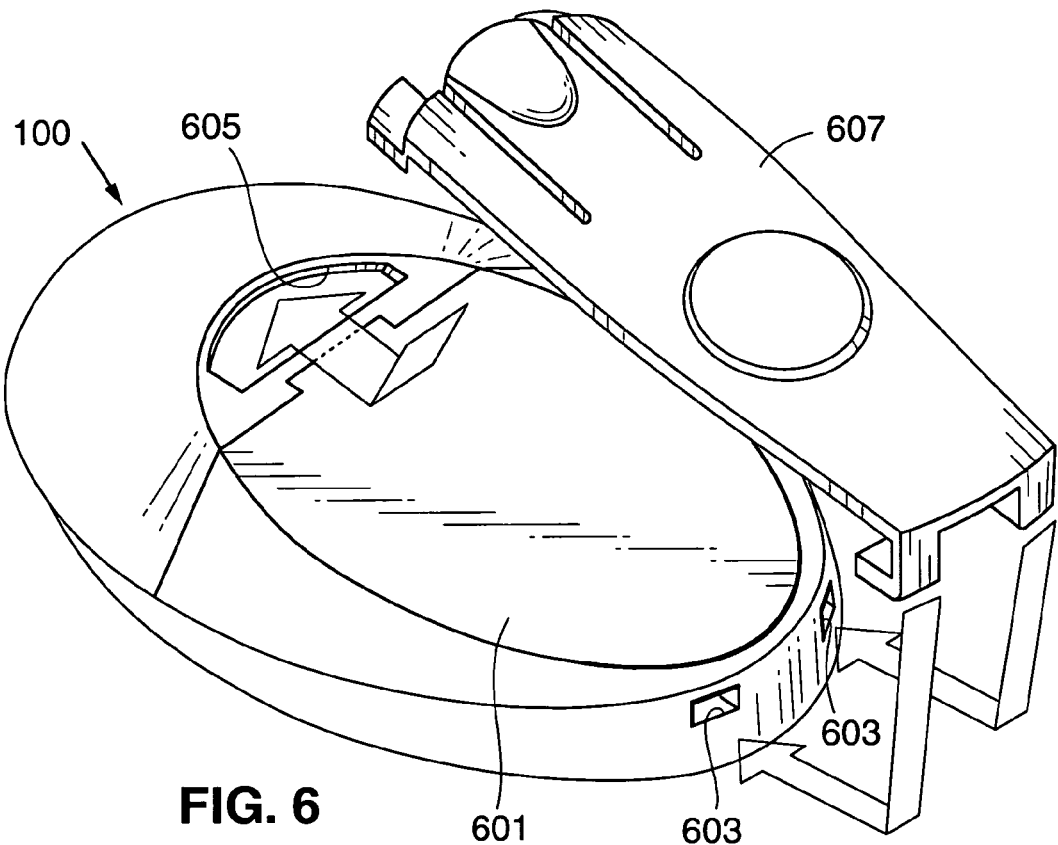
FIG. 6 is a perspective view of the rear surface of the embodiment shown in FIG. 1 along with a universal mounting clip.
Figure 7:
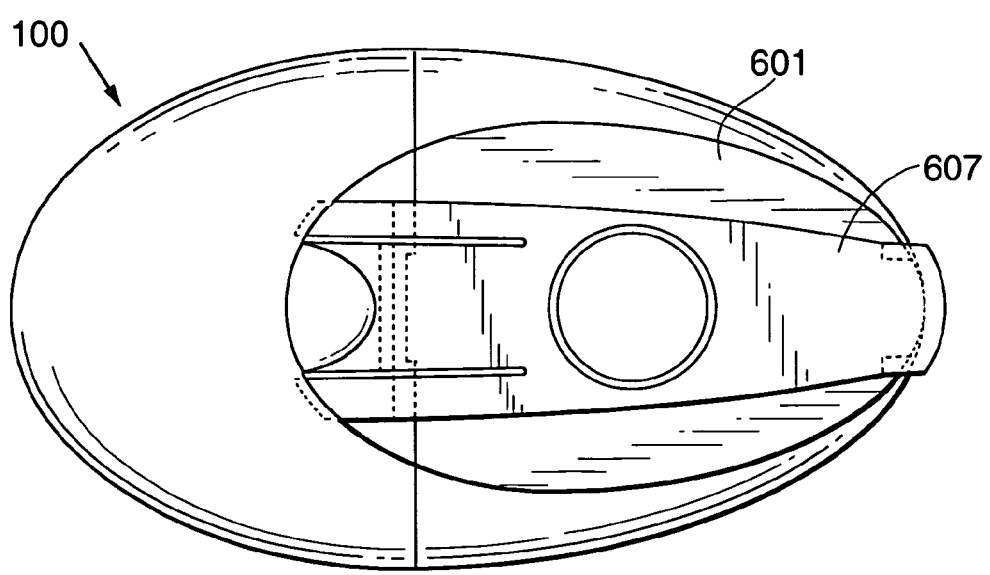
FIG. 7 is a rear view of the speakerphone shown in FIG. 6 with the universal mounting clip attached.
Figure 8:
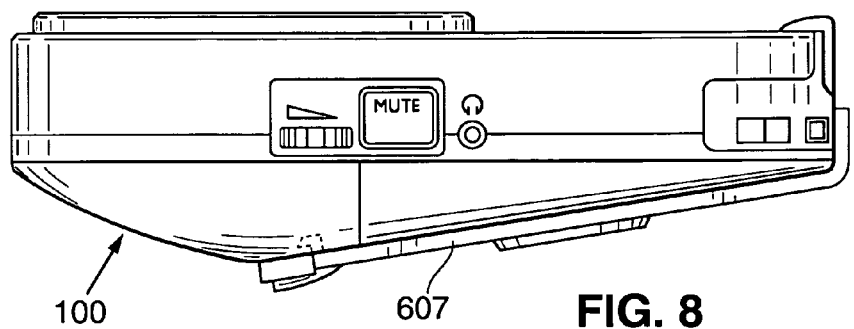
FIG. 8 is a side view of the speakerphone shown in FIG. 6 with the universal mounting clip attached.
Figure 9:
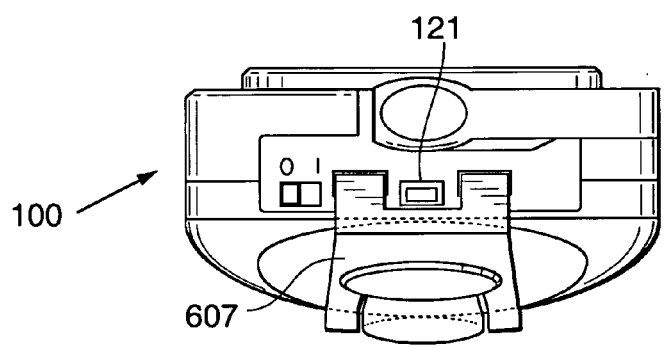
FIG. 9 is an end view of the speakerphone shown in FIG. 6 with the universal mounting clip attached.

In a preferred embodiment, the speakerphone includes means for coupling a variety of different types of mounting hardware to the device. FIG. 6 is an illustration of the rear or back surface 601 of speakerphone 100. Although there are countless ways of coupling mounting hardware to the speakerphone, preferably the speakerphone includes one or more openings 603 at its base that work in conjunction with one or more openings 605 located on back surface 601. As opposed to each type of mount being directly coupled to the speakerphone, preferably a universal mounting clip 607 is mounted to the speakerphone. FIGS. 7-9 show bottom, side and end views, respectively, of speakerphone 100 with mounting clip 607 attached.

Figure 10:
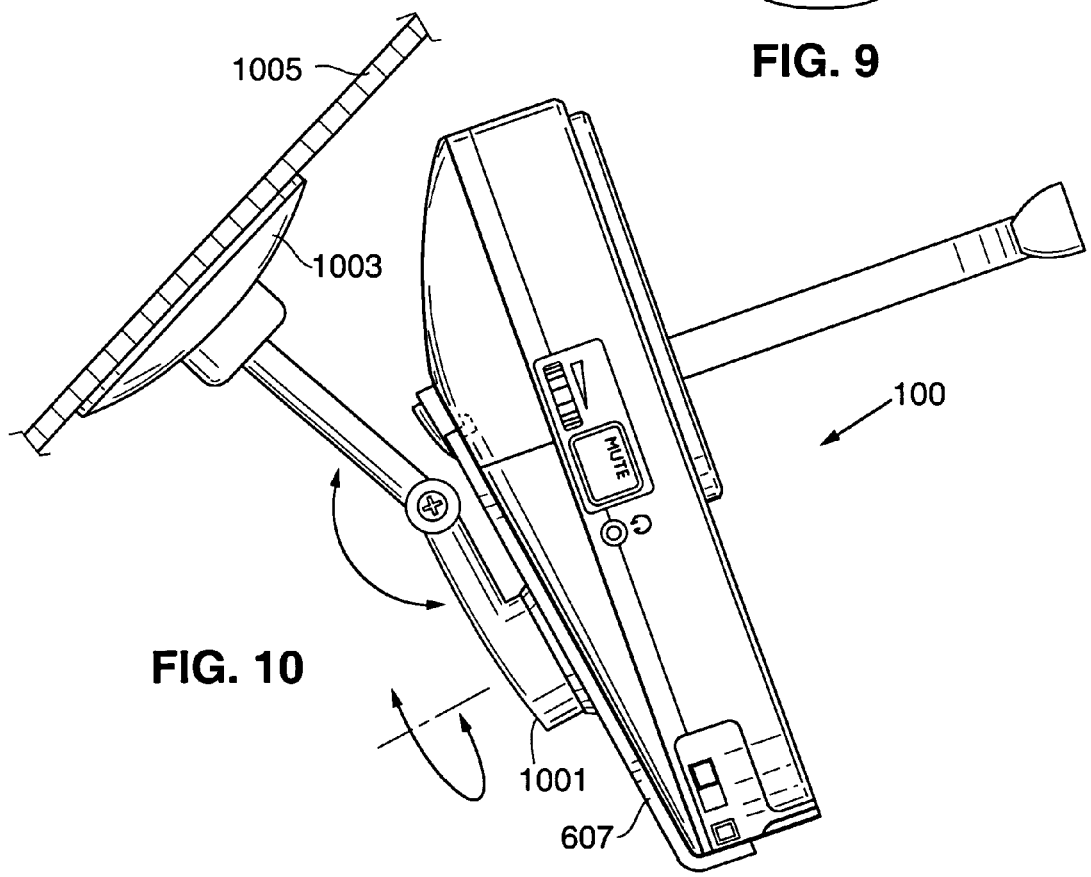
FIG. 10 is a side view of a speakerphone with an attached suction cup mounting bracket.

FIG. 10 is a side view of speakerphone 100 with a suction cup mounting bracket 1001 coupled to universal mounting clip 607. Suction cup 1003 can be attached to a windshield 1005 or other smooth surface. Bracket 1001 provides both angular and rotational adjustment, thus allowing speakerphone 100 to be oriented as desired.

Figure 11:
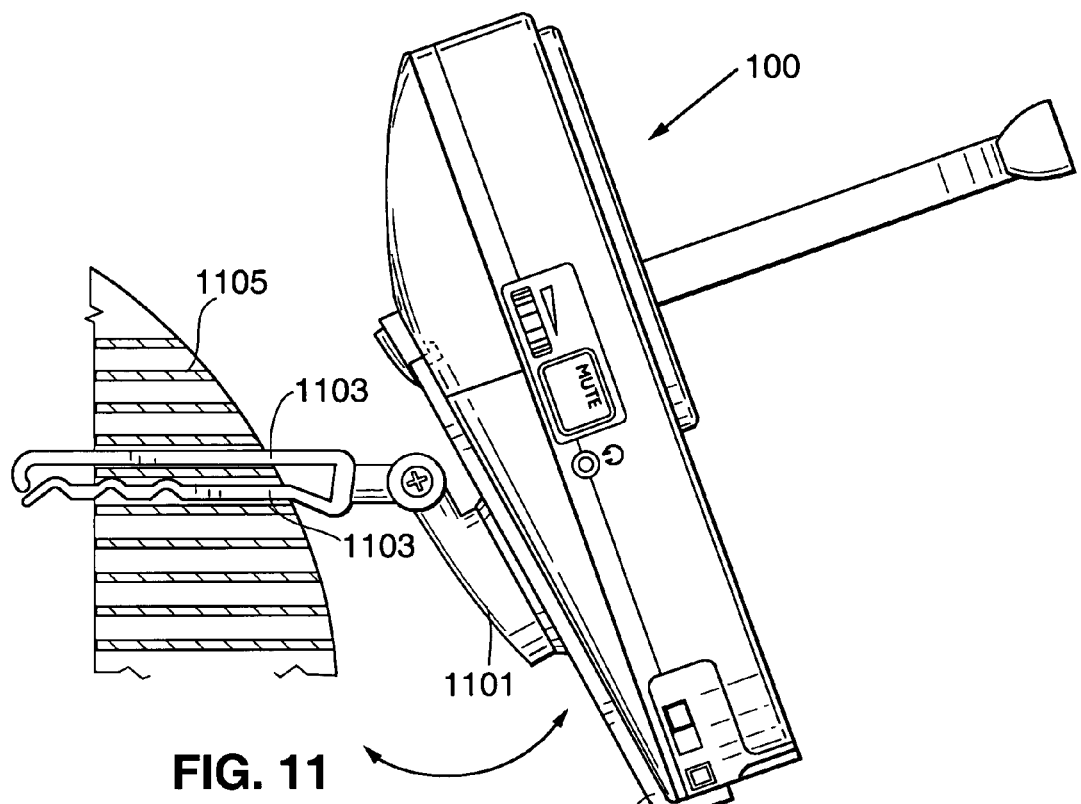
FIG. 11 is a side view of a speakerphone with an attached vent mounting bracket.

FIG. 11 is a side view of speakerphone 100 with a vent mounting bracket 1101 coupled to universal mounting clip 607. Bracket 1101 includes at least two vent retaining members 1103 designed to secure the bracket and attached speakerphone to an automobile vent 1105 or similar structure. Preferably bracket 1101 provides angular adjustment, and more preferably both angular and rotational adjustment, thus allowing speakerphone 100 to be oriented as desired.

Figure 12:
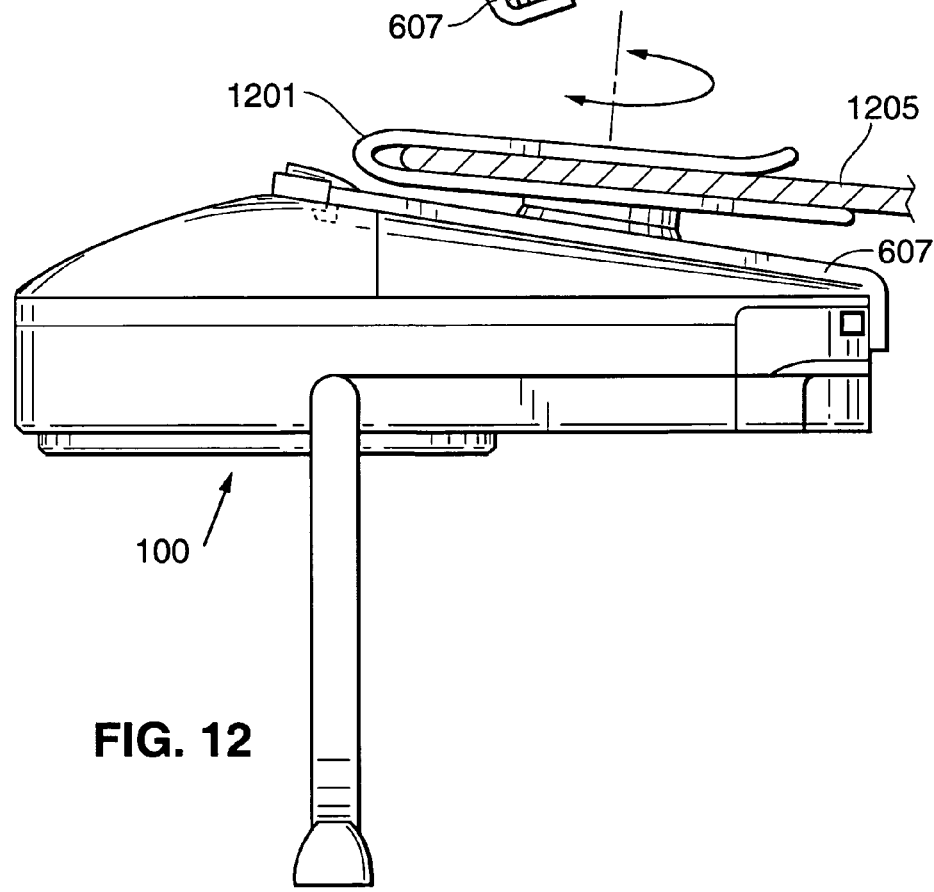
FIG. 12 is a side view of a speakerphone with an attached visor mounting bracket.

FIG. 12 is a side view of speakerphone 100 with a mounting bracket 1201 coupled to universal mounting clip 607. Bracket 1201 is designed to mount to a relatively flat and thin member 1205 (e.g., car visor). Bracket 1201 can be rotated to optimize speakerphone orientation.

Regardless of the mounting bracket used, as illustrated speakerphone 100 can still be attached to an external power source, for example using a cigarette lighter adaptor. As shown in FIG. 9, even with universal mounting clip 607 in place, an external power source can still be coupled to port 121.

Figure 13:
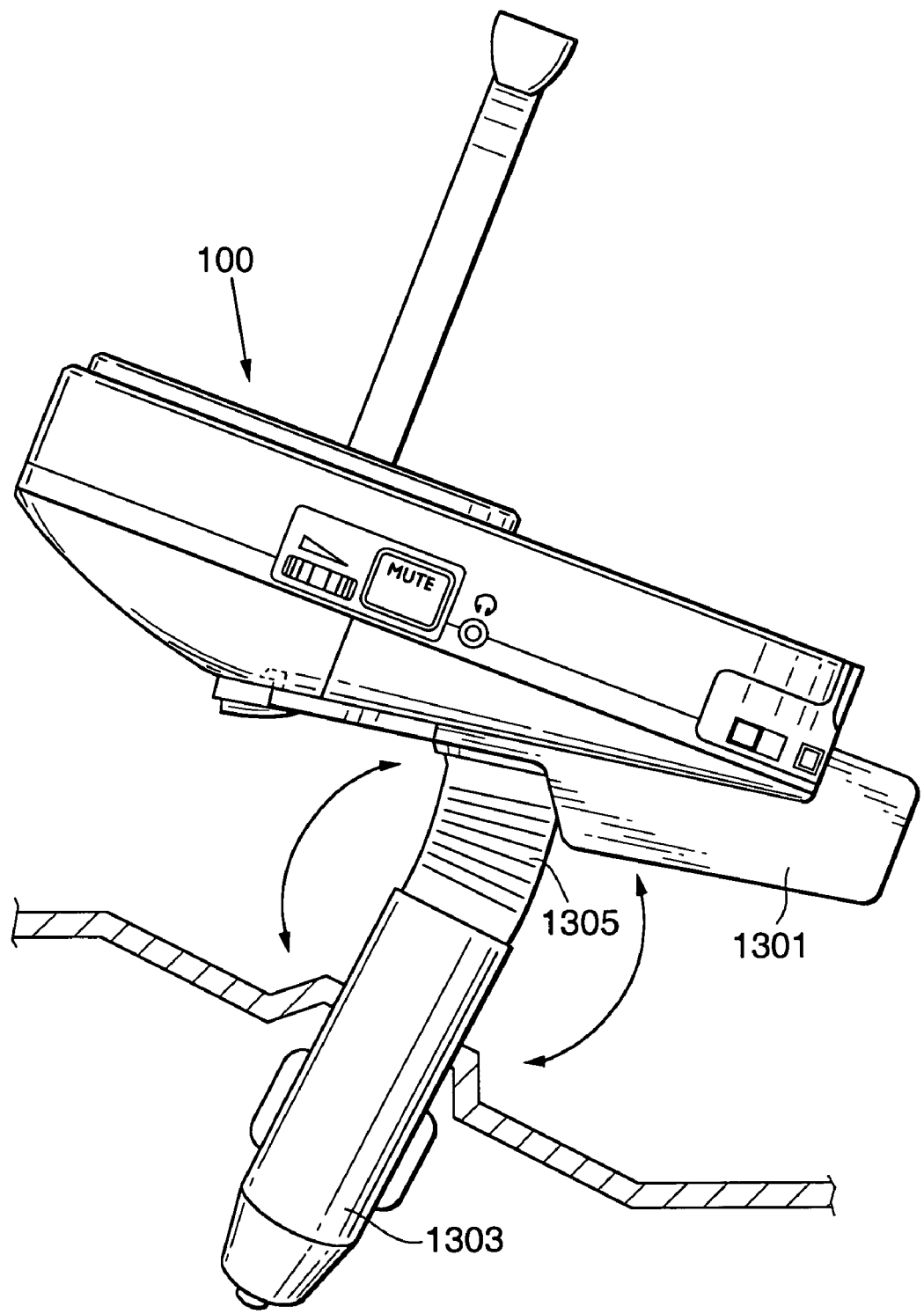
FIG. 13 is a side view of a speakerphone with an attached cigarette lighter mounting bracket.

FIG. 13 illustrates an alternate mounting arrangement. As shown, bracket 1301 attaches to speakerphone 100 without the use of universal clip 607. In use, plug member 1303 is inserted into a cigarette lighter, thus providing both a means of mounting the speakerphone and an external power source. Preferably the stalk member 1305 of bracket 1301 is flexible, thus allowing the user to orient the speakerphone as desired.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A speakerphone comprising:
   a housing;
   a speaker mounted to said housing;
   a unidirectional microphone;
   a microphone boom pivotably coupled to said housing, said microphone boom capable of being placed at a plurality of positions, said unidirectional microphone mounted at a distal end of said microphone boom, wherein a region of said microphone having a lowest sensitivity is aimed at said speaker when said microphone boom is located in any of said plurality of positions; and
   a wireless networking module adapted to transmit first signals via a short distance wireless network to a peripheral electronic device and to receive second signals via said short distance wireless network from said peripheral electronic device, wherein said first signals are initially received by said unidirectional microphone, and wherein said second signals are output by said speaker after receipt by said wireless network module.

2. The speakerphone of claim 1, wherein said peripheral electronic device forwards said first signals via a long distance communication network and wherein said second signals are transmitted to said peripheral electronic device via said long distance communication network.

3. The speakerphone of claim 2, wherein said long distance communication network is a cellular telephone network.

4. The speakerphone of claim 1, wherein said peripheral electronic device is a cellular telephone.

5. The speakerphone of claim 1, wherein said wireless networking module is a Bluetooth enabled networking module and said peripheral electronic device is a Bluetooth enabled cellular telephone.

6. The speakerphone of claim 1, wherein said wireless networking module is a Bluetooth enabled networking module and wherein said peripheral electronic device further comprises a Bluetooth enabled adaptor.

7. The speakerphone of claim 1, wherein said wireless networking module is an IEEE802.11 enabled networking module and said peripheral electronic device is an IEEE802.11 enabled cellular telephone.

8. The speakerphone of claim 1, wherein said wireless networking module is an IEEE802.11 enabled networking module and wherein said peripheral electronic device further comprises an IEEE802.11 enabled adaptor.

9. The speakerphone of claim 1, further comprising at least one status indicator.

10. The speakerphone of claim 1, further comprising a display means coupled to said housing.

11. The speakerphone of claim 10, wherein said display means is capable of displaying at least one of battery level, signal level, volume level, call status, speakerphone status, pairing status, caller identification, time, elapsed time, date, phone history, phone lists, and calendar.

12. The speakerphone of claim 10, wherein said display means is capable of displaying a text message.

13. The speakerphone of claim 10, wherein said display means is selected from the group of display means consisting of liquid crystal displays, light emitting polymer displays, electroluminescent displays, active matrix electroluminescent displays, organic thin film transistor displays, active matrix organic light emitting diode displays, amorphous silicon integrated displays, and pliable display technology displays.

14. The speakerphone of claim 1, further comprising a sound processor.

15. The speakerphone of claim 1, further comprising a portable power source.

16. The speakerphone of claim 15, further comprising means for coupling an external power source to said speakerphone.

17. The speakerphone of claim 1, further comprising means for coupling a mounting bracket to said housing.

18. The speakerphone of claim 1, further comprising a power switch.

19. The speakerphone of claim 1, further comprising a volume control.

20. The speakerphone of claim 1, wherein the microphone exhibits a cardioid polar pattern.

21. The speakerphone of claim 1, wherein the microphone is most sensitive to sound arriving from only one direction.

22. A speakerphone comprising:
  a housing;
  a speaker mounted to said housing;
  a unidirectional microphone;
  a sound processor coupled to said unidirectional microphone;
  a portable power source coupled to said sound processor;
  a microphone boom pivotably coupled to said housing, said microphone boom capable of being placed at a plurality of positions, said unidirectional microphone mounted at a distal end of said microphone boom, wherein a region of said microphone having a lowest sensitivity is aimed at said speaker when said microphone boom is located in any of said plurality of positions; and
  a Bluetooth enabled networking module adapted to transmit first signals to a Bluetooth enabled cellular telephone and to receive second signals from said Bluetooth enabled cellular telephone.

23. The speakerphone of claim 22, wherein the microphone exhibits a cardioid polar pattern.

24. The speakerphone of claim 22, wherein the microphone is most sensitive to sound arriving from only one direction.

* * * * *